United States Patent [19]

Riedl

[11] 4,236,417

[45] Dec. 2, 1980

[54] UNBALANCE OSCILLATION GENERATOR

[75] Inventor: Franz Riedl, Munich, Fed. Rep. of Germany

[73] Assignee: Wacker Werke GmbH & Co. KG, Munich, Fed. Rep. of Germany

[21] Appl. No.: 885,011

[22] Filed: Mar. 9, 1978

[30] Foreign Application Priority Data

Mar. 10, 1977 [DE] Fed. Rep. of Germany ....... 2710349

[51] Int. Cl.³ .............................................. F16H 33/10

[52] U.S. Cl. ...................................... 74/87; 209/366.5

[58] Field of Search ............... 74/61, 87, 527; 172/40; 128/34, 35, 36; 198/770; 209/366.5, 367; 310/81; 404/117

[56] References Cited

U.S. PATENT DOCUMENTS

| | | | |
|---|---|---|---|
| 3,217,559 | 11/1965 | Elligson | 74/527 |
| 3,339,422 | 9/1967 | Petrin | 74/87 |
| 3,814,533 | 6/1974 | Buck | 404/117 X |
| 3,909,147 | 9/1975 | Takata | 404/117 |

FOREIGN PATENT DOCUMENTS

| | | | |
|---|---|---|---|
| 1285777 | 12/1968 | Fed. Rep. of Germany | 74/61 |

*Primary Examiner*—Lawrence J. Staab

*Attorney, Agent, or Firm*—Becker & Becker, Inc.

[57] ABSTRACT

An unbalance oscillation generator with constant direction of rotation, in which the resultant centrifugal force is variable due to unbalance on the unbalance shaft including two parts adjustable relative to each other and fixable relative to each other in at least two relative angularly spaced positions. The resultant of the two unbalance forces generated by the two parts varies in value in the individual fixable relative angle positions. A control pin displaceable by means of an adjusting rod extending through the unbalance shaft and projecting from the end face of the unbalance shaft either engages a circumferential groove facing the unbalance shaft but located in the axially non-displaceable part of the unbalance weight or engages a recess or cutout branching off from the circumferential groove. The control pin fits with slight play into the recess and is adapted to be arrested in either one of the respective pertaining axial positions.

6 Claims, 3 Drawing Figures

UNBALANCE OSCILLATION GENERATOR

The present invention relates to an unbalance oscillation generator with constant direction of rotation, in which the resultant centrifugal force can be varied by the fact that the unbalance weight on the unbalance shaft comprises a part which in nonrotatably mounted on said unbalance shaft and also comprises a part which is rotatably mounted on said unbalance shaft. These two parts are rotatable relative to each other and are adapted to be fixed relative to each other in at least two relative angular positions while the resultant of the forces generated by the two weight parts in the individual fixable relative angular positions have different values.

With the heretofore known oscillation generators, which are for instance widely used in ground compacting devices, it is customary for purposes of changing the resultant centrifugal force for obtaining optimum working conditions in conformity with the material to be compacted, to take off the rotatable part while the device is at a standstill, by loosening the connecting members such as screws or the like from the nonrotatable part whereupon the rotatable part is angularly adjusted relative to the nonrotatable part and is there again connected to the non-rotatable part on the unbalance shaft. This way of resetting the device is time consuming and can be carried out only by the aid of tools.

With other heretofore known unbalance oscillation generators of the above mentioned general type, the nonrotatable part and the rotatable part are interconnected by a gear transmission in such a way that they can be adjusted between predetermined extreme positions in a continuous manner while at a standstill as well as while in operation. This design is technically rather complicated and expensive and is very liable to disorders in view of the rough working conditions to which the oscillation generator is exposed during operation.

With unbalance oscillation generators equipped with a driving motor the direction of rotation is reversible, it is furthermore known to move a rotatable unbalance part relative to a nonrotatable unbalance part in two different positions by having the rotatable part of the unbalance weight over a predetermined angle range arranged freely rotatable on the unbalance shaft in order during the operation of the unbalance shaft in one direction of rotation, to move into one of two different end positions which are fixed by abutment on the parts of the unbalance weights which are rotatable relative to each other, and, in order when driving the unbalance shaft in the other direction of rotation to move into the other end position. This design requires the possibility to be able to change the direction of rotation of the unbalance oscillation generator or at least to be able to exert a strong braking action for purposes of reversing the direction of rotation.

This possibility frequently does not exist in particular when simple driving motors are utilized.

It is, therefore, an object of the present invention to provide an unbalance oscillation generator of the above mentioned general type in which it is possible without using tools, quickly to change the resultant centrifugal force in steps, and to do this by means of relatively few additional structural elements while the oscillation generator is substantially not liable to any disorders over heretofore known unbalance oscillation generators in which the resultant centrifugal force can be varied.

These and other objects and advantages of the invention will appear more clearly from the following specification in connection with the accompanying drawings, in which.

Figure 1:
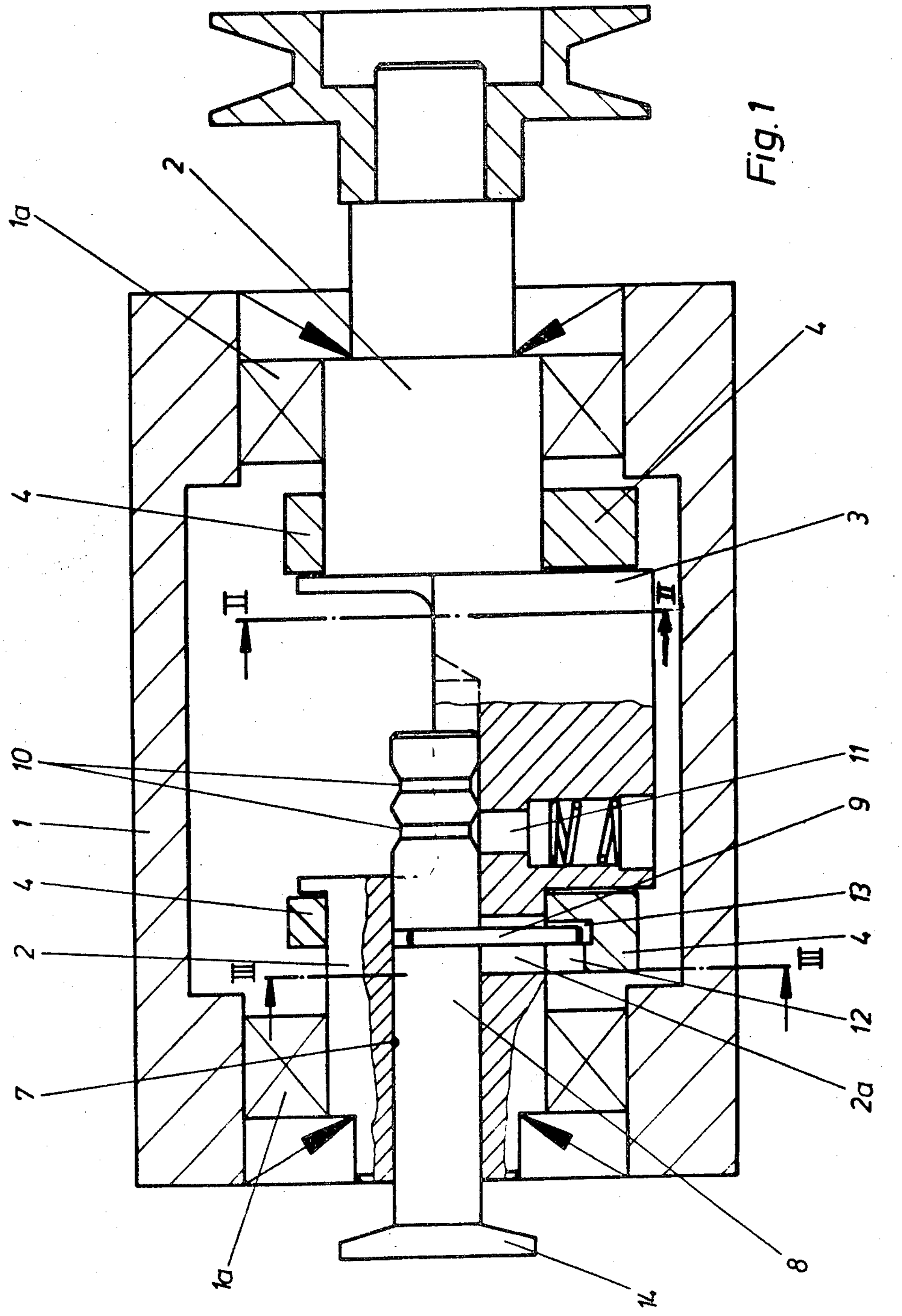
FIG. 1 shows a longitudinal section through an unbalance oscillation generator according to the invention.

The unbalance oscillation generator according to the present invention is characterized primarily in that from the unbalance shaft there projects in radial direction a control pin or the like which by means of an adjusting shaft extending through the unbalance shaft in longitudinal direction and projecting from the end face thereof is displaceable in the longitudinal direction of the unbalance shaft and independently of its position along the unbalance shaft engages either a circumferential groove facing said unbalance shaft and provided in the rotatable but axially nondisplaceable part of the unbalance weight, or engages a recess which in axial direction of the unbalance shaft branches off from the circumferential groove, said branching off recess being engaged by said control pin with a slight play while the control pin is arrestable in the respective different axial positions with regard to the unbalance shaft. The unbalance oscillation generator requires only few additional structural elements over the unbalance oscillation generators making an adjustment of the unbalance force. The simple sturdy build-up of the device according to the present invention is also an assurance against any material liability to disorders. The adjusting operation can be effected by a simple pull or pressure upon the adjusting shaft and can be carried out extremely quickly and without the necessity of using any tools.

According to an advantageous further development of the invention, it is provided that from the circumferential groove there branches off a plurality of recesses for the control pin, which recesses are arranged in spaced relationship to each other along the circumferential groove. This embodiment furnishes the possibility for setting a considerable number of stepped centrifugal values.

According to a further development of the invention, the maximum relative angle of rotation between the nonrotatable and the rotatable part of the unbalance weight is limited by cooperating abutment surfaces on said parts to an angle of less than 180°. This design yields the advantage that the two parts of the unbalance weight which are rotatable relative to each other will when the control pin is retracted into the circumferential groove of said rotatable part, always move toward each other into the same relative position with regard to each other, when the unbalance generator after the drive has been turned off, comes to a standstill. This relative position on the two parts movable relative to each other is safely reached under the effect of the force of gravity because the limitation of the angle of rotation to less than 180° excludes any accidental stopping of the rotatable part in a position of unstable equilibrium. Such condition could occur only when the center of gravity of the nonrotatable part and of the rotatable part are located opposite to each other in one and the same plane comprising the central axis of the unbalance shaft. This condition is excluded by a maximum angular range of less than 180° if said range is selected in conformity with the nonrotatable unbalance mass.

Preferably, the control pin is arrestable in the two control positions by having the adjusting shaft comprise two serially arranged circumferential engageable grooves which are spaced from each other by a distance which corresponds to the distance of the control positions of the control pin and which are engageable by an engaging nose which is stationary with regard to the unbalance shaft.

Further developments of the device according to the invention comprise the fact that the rotatable part of the unbalance weight comprises two sections which are symmetrically arranged relative to the stationary part and which are interconnected by a coupling rod extending transverse to and above the stationary part. According to a further feature, the adjusting range of the rotatable part of the unbalance weight with regard to the nonrotatable part is so arranged that these parts are adjustable relative to each other from a position in which the partial centrifugal forces substantially add up vectorially to a position in which the partial centrifugal forces substantially subtract, and vice versa.

Referring now to the drawings in detail, the generator illustrated in FIG. 1 comprises a housing 1 in which by means of bearings 1a there is rotatably journalled an unbalance shaft 2 which is adapted to be driven for instance by means of a V-belt and a pulley.

Figure 2:
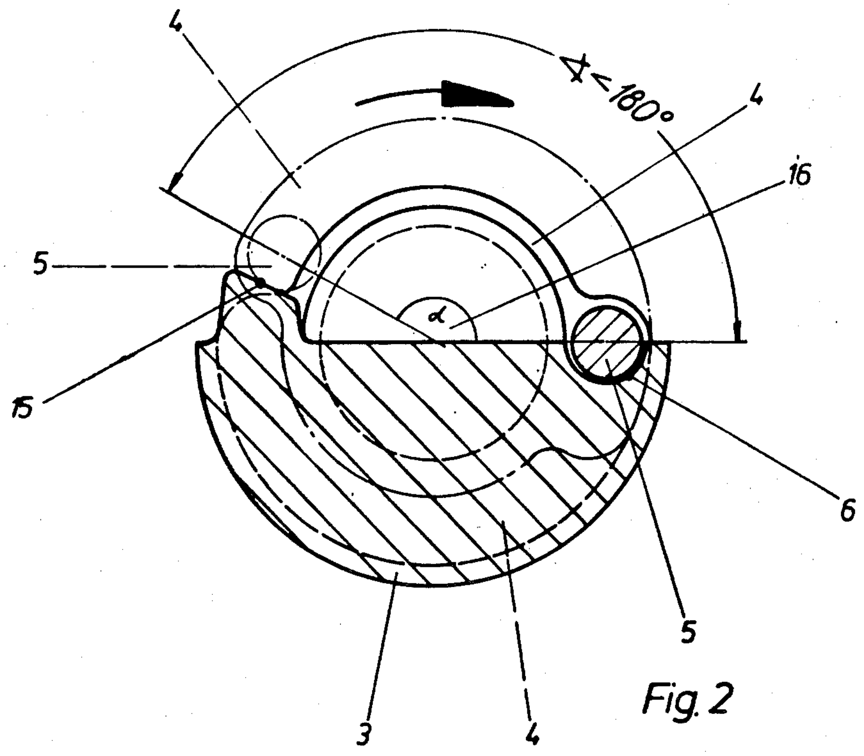
FIG. 2 represents a section taken along the line II—II of FIG. 1.

The unbalance shaft 2 preferably in the center area between the bearings 1a comprises an unbalance part 3 which is nonrotatably connected to said shaft 2. Furthermore, rotatably mounted on shaft 2 is a further unbalance part 4 comprising two sections which on one and the other side directly adjoin the unbalance part 3 fixedly connected to shaft 2. These two sections 4 (FIGS. 2 and 3) are interconnected so as to be nonrotatable relative to each other.

Figure 3:
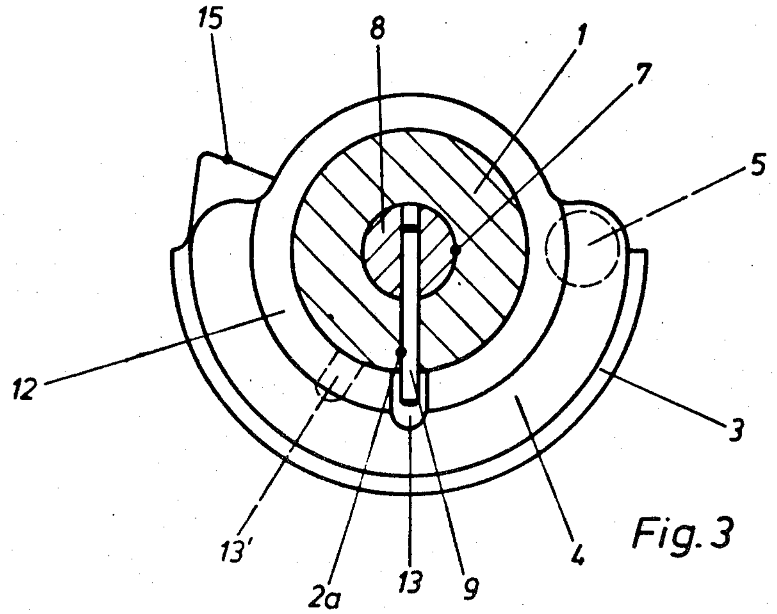
FIG. 3 represents a cross section through the rotating part of the oscillation generator according to FIG. 1, said cross section being taken along the line III—III of FIG. 1.

This interconnection is effected by a coupling rod 5 which passes through the unbalance part 3. For the coupling rod 5, in the unbalance part 3 of the unbalance weight there is provided a unilaterally open pocket 6 which extends over the entire length of unbalance part 3 and is adapted to the shape of the coupling rod. It is this pocket 6 in which the coupling rod will lie when the two parts 3,4 of the unbalance weight occupy the position shown in solid lines in the drawing. The two parts of the unbalance weight which are movable relative to each other move into the said last mentioned position when no coupling is effective between the said two parts and the latter are in their rest position. These two parts reach the said position under the effect of the force of gravity which orients the centers of gravity in the same radial direction. In view of this orientation, the centrifugal forces generated by said two parts would vectorically add up completely when the said parts in their respective positions would be turned while their rotation would be maintained. This is the case with the embodiment illustrated in the drawing with the aid of the mechanism described below:

An adjusting rod 8 is slideably inserted in to a longitudinal bore 7 of the unbalance shaft 2 which bore 7 is open toward the outside. Connected to the adjusting rod 8 in any convenient manner, e.g. by press fit or welding is a control pin 9 which radially projects from said rod 8. The control pin 9 passes through a slot 2a which extends in radial direction of the unbalance shaft 2. The width of said slot 2a is only slightly greater than the diameter of the control pin 9. The control pin 9 is so long that a portion thereof projects from the unbalance shaft 2. With its projecting end, the control pin 9, depending on the longitudinal position of the adjusting rod 8, leads either into a circumferential inner groove 12 which faces the unbalance shaft 2 and is located in the left hand section (with regard to FIG. 1) of the rotatable part 4 of the unbalance weight or into a, or as the case may be, a plurality of recesses 13, 13' (FIG. 3) which in axial direction of the unbalance shaft 2 branches or branches off from the circumferential groove 12. In other words, the recess 13 is a mere cut-out of the right hand (with regard to FIG. 1) side wall of the groove 12. Thus, as is particularly clearly shown in FIG. 3, as long as the lower portion of control pin 9 is located in the cutout 13, the parts 3 and 4 of the unbalance weight are no longer rotatable relative to each other but are locked to each other in their respective relative position as illustrated in FIG. 3 in heavy lines, so that the parts 3 and 4 rotate in this relative position when the unbalance shaft 2 is driven. There will then be obtained the maximum centrifugal force.

If, however, the control pin 9 has been retracted from its position shown in FIG. 1 toward the left (with regard to FIG. 1) into the centrifugal groove 12, no coupling exists any longer between the parts 3 and 4 by means of pin 9. Such coupling is rather brought about by the fact that when starting the rotation of the unbalance shaft 2 in the direction of the arrow in FIG. 2 with the weight part 3 nonrotatably connected to shaft 2, an abutment surface 15 provided on the weight 3 contacts the coupling rod 5 of the at that time still standing rotatable unbalance weight part 4 and subsequently takes along part 4 relative to part 3 while the then reached position of part 4 illustrated in FIG. 2 by dot-dash lines is maintained. In this dragging position, the resultant centrifugal force reaches a value which reduces the greater centrifugal force of the two individual centrifugal forces generated by the weight parts 3 and 4 and corresponds substantially to the full value of the smaller centrifugal force.

The recess 13' is provided for an intermediate position in which the resultant centrifugal force lies between the above mentioned maximum value and the above mentioned minimum value.

For securing the control pin 9 or the adjusting rod 8 in the two above mentioned operative positions (dragging position or coupling by the control pin 9), two circumferential engageable grooves 10 are provided in the adjusting rod 8 at the front end thereof. A spring loaded engaging nose 11 is adapted to engage the grooves 10. The axis of said nose 11 is fixed with regard to the axial direction of the unbalance shaft 2. The action of the nose 11 is adapted to be overcome by respectively depressing and pulling an operating knob 14 on the adjusting rod 8. The mutual spacing between the grooves 10 corresponds to the distance between the two operative positions of the control pin 9. In FIG. 1 only two grooves 10 are shown corresponding to two operative positions. If three operative positions are desired, of course, a third correspondingly located annular groove 10 is to be provided.

As will be seen from the above, the relative position of the maximum centrifugal force at the standstill of the unbalance generator is obtained automatically by means of the centrifugal force when the control pin 9 has been withdrawn from cutout 13 into the circumferential groove 12, while then the recess 13 will be located precisely in front of the control pin 9 so that this relative position between the weight parts 3 and 4, without observing special care for the operation of the generator can be fixed by maximum centrifugal force by a simple pressure in axial direction of the adjusting rod 8 upon the operating knob 14. Also the relative position for an operation with a minimum centrifugal force is obtainable without exercising special care, simply by retracting the control pin 9 into the circumferential groove 12 by a simple pull on knob 14, while the oscillation generator is operated in this position of the control pin 9. In contrast thereto, the operation of the oscillation generator by means of a centrifugal force between said two extreme values, requires a certain but very minor care because attention has to be paid to the fact that the control pin 9 has to lie in alignment with a recess other than the recess 13, in the illustrated embodiment in alignment with the recess 13', before the control pin 9 by depressing the knob 14 has to be ejected from the circumferential groove 12 into said recess 13'. For this purpose, markings may be provided for instance at the end face of the unbalance shaft 2 on one hand and on the knob 14 on the other hand.

It is, of course, to be understood that the present invention is, by no means, limited to the specific showing in the drawings, but also comprises any modifications within the scope of the appended claims.

What I claim is:

1. As unbalance oscillation generator with constant direction of rotation and with variable resultant centrifugal force, includes: a housing, an unbalance shaft rotatably journalled in said housing and provided with an unbalance weight comprising a first part nonrotatably connected to said unbalance shaft for rotation therewith and also comprising a second part rotatably arranged on said unbalance shaft and movable into and arrestable in at least two angularly spaced positions relative to each other while the resultant of the two unbalance forces generated by the two parts varies in said at least two angularly spaced positions, a control pin projecting from said unbalance shaft in radial direction, an adjusting rod extending through a section of said unbalance shaft in the longitudinal direction thereof and having said control pin connected thereto, said adjusting rod being movable selectively into a first position corresponding to one of said angularly spaced positions of said second part of positively coupling said unbalance shaft to said second part by means of said pin to obtain a maximum centrifugal force and also being movable into a second position corresponding to the other one of said angularly spaced positions of said second part to disengage said positive coupling and in cooperation with said first and second part to obtain a centrifugal force less than said maximum centrifugal force, said second part having a circumferential groove and a recess communicating with said groove but offset relative to the latter in the longitudinal direction of said unbalance shaft, said recess being engaged by said control pin in a first position of said adjusting rod, and said groove being engaged in a second position of said adjusting rod.

2. An unbalance oscillation generator according to claim 1, which includes a second recess communicating with but offset relative to said groove for selective engagement with said control pin to positively couple said second part to said unbalance shaft in a third position angularly offset to said first and second angular positions.

3. An unbalance oscillation generator according to claim 1, in which said first and second parts are provided with abutment means operable to engage each other for limiting the angular offset between said first and second position to less than 180°.

4. An unbalance oscillation generator according to claim 1, in which said adjusting rod is provided with two circumferential arresting grooves spaced from each other in axial direction of said adjusting rod, and which comprises a spring urged arresting nose arranged in said unbalance shaft for engagement with either one of said circumferential arresting grooves for respectively locking said adjusting rod in either one of said first and second positions.

5. An unbalance oscillation generator according to claim 1, in which said second part of said unbalance weight comprises two sections arranged symmetrically with regard to said first part, and which includes a coupling rod traversing said first part and interconnecting said last mentioned two sections.

6. An unbalance oscillation generator according to claim 1, in which the adjusting range of said second part of said unbalance weight is such with regard to said first part that said first and second parts are adjustable relative to each other between a first position in which the centrifugal forces of said parts vectorially substantially completely add up, and in a second position in which said last mentioned centrifugal forces substantially completely subtract from each other.

* * * * *